United States Patent
Lüdecke et al.

(10) Patent No.: US 10,408,302 B2
(45) Date of Patent: Sep. 10, 2019

(54) ROLLER CHAIN

(71) Applicant: Renold GmbH, Einbeck (DE)

(72) Inventors: Steffen Lüdecke, Hardegsen (DE); Hans-Jürgen Kreipe, Bad Wünnenberg (DE)

(73) Assignee: RENOLD GMBH, Einbeck (DE)

( * ) Notice: Subject to any disclaimer, the term of this patent is extended or adjusted under 35 U.S.C. 154(b) by 303 days.

(21) Appl. No.: 15/586,218

(22) Filed: May 3, 2017

(65) Prior Publication Data

US 2017/0234404 A1   Aug. 17, 2017

Related U.S. Application Data

(63) Continuation of application No. PCT/EP2015/075627, filed on Nov. 3, 2015.

(30) Foreign Application Priority Data

Nov. 4, 2014   (DE) .................... 20 2014 105 286 U

(51) Int. Cl.
  *F16G 13/06* (2006.01)
  *C21D 9/00* (2006.01)
  *C23C 8/26* (2006.01)
(52) U.S. Cl.
  CPC ........... *F16G 13/06* (2013.01); *C21D 9/0087* (2013.01); *C23C 8/26* (2013.01)
(58) Field of Classification Search
  CPC .......... C21D 9/0087; F16G 13/06; C23C 8/26
  See application file for complete search history.

(56) References Cited

U.S. PATENT DOCUMENTS 3,630,097 A * 12/1971 Kuratomi ................ F16G 13/06
                                                474/230
3,643,517 A *  2/1972 Paul ........................ F16G 13/06
                                                474/220

(Continued)

FOREIGN PATENT DOCUMENTS

DE         29 23 532      7/1980
DE   20 2005 008 582 U    9/2005

(Continued)

OTHER PUBLICATIONS

The Response of Austenitic Stainless Steels to Low-Temperature Plasma Nitriding (Year: 1999).*

(Continued)

*Primary Examiner* — Michael R Mansen
*Assistant Examiner* — Juan J Campos, Jr.
(74) *Attorney, Agent, or Firm* — Brinks Gilson & Lione

(57) ABSTRACT

A roller chain includes pins, bushings, rollers, inner plates and outer plates. Two bushings are connected to one another in each case by way of at least two inner plates to form a chain link. Two consecutive chain links are articulately connected to one another in each case by way of each bushing being seated on a pin projecting beyond both ends of the bushing. At least one combination, which consist of two mutually frictionally engaged components—the pin and bushing on the one hand, the bushing and roller on the other hand,—include one component consisting of austenitic stainless steel with an S-phase formed at least on the surface by way of nitriding at a temperature between about 400° C. and 500° C., and another component consisting of a stainless ferritic steel, which at least on the surface, is nitrided at a temperature between about 1000° C. and 1200° C.

3 Claims, 1 Drawing Sheet

(56) References Cited

U.S. PATENT DOCUMENTS

| | | | | | |
|---|---|---|---|---|---|
| 4,315,750 | A | * | 2/1982 | Kawashima | F16H 7/06 474/153 |
| 4,571,229 | A | * | 2/1986 | Burk | F16G 13/06 474/231 |
| 4,704,099 | A | * | 11/1987 | Rohloff | F16G 13/06 474/216 |
| 5,092,822 | A | * | 3/1992 | Wakabayashi | F16H 7/06 474/209 |
| 5,176,587 | A | * | 1/1993 | Mott | F16G 13/06 474/216 |
| 5,192,252 | A | * | 3/1993 | Skurka | F16G 13/06 474/210 |
| 5,226,856 | A | * | 7/1993 | Iacchetta | F16G 13/06 474/207 |
| 5,267,909 | A | * | 12/1993 | Iacchetta | F16G 13/04 474/206 |
| 5,412,934 | A | * | 5/1995 | Furuyama | F16G 13/06 474/206 |
| 5,507,697 | A | * | 4/1996 | Ledvina | F01L 1/02 474/231 |
| 5,562,558 | A | * | 10/1996 | Kubota | B65G 17/38 474/209 |
| 5,690,571 | A | * | 11/1997 | Mott | F16G 13/04 474/212 |
| 5,921,880 | A | * | 7/1999 | Ishimoto | F16G 13/06 474/207 |
| 5,938,554 | A | * | 8/1999 | Moster | F16G 13/06 474/206 |
| 8,011,497 | B2 | * | 9/2011 | Ono | F16G 13/06 198/500 |
| 2002/0111238 | A1 | * | 8/2002 | Okabe | F16G 13/04 474/213 |
| 2002/0115514 | A1 | * | 8/2002 | Okabe | F16G 13/04 474/212 |
| 2002/0132690 | A1 | * | 9/2002 | Suzuki | F16G 13/04 474/212 |
| 2003/0159425 | A1 | * | 8/2003 | Matsuura | B21L 9/065 59/4 |
| 2003/0192299 | A1 | * | 10/2003 | Kaga | B21L 9/065 59/5 |
| 2004/0018905 | A1 | * | 1/2004 | Okabe | F16G 13/06 474/231 |
| 2004/0171450 | A1 | * | 9/2004 | Kaga | F16G 13/06 474/231 |
| 2004/0192481 | A1 | * | 9/2004 | Okabe | F16G 13/06 474/231 |
| 2004/0192482 | A1 | * | 9/2004 | Okabe | F16G 13/06 474/231 |
| 2007/0186999 | A1 | * | 8/2007 | Kuroda | C23C 8/26 148/217 |
| 2008/0307767 | A1 | | 12/2008 | Ragnitz et al. | |
| 2009/0105024 | A1 | * | 4/2009 | Sakura | F16G 13/06 474/156 |
| 2009/0247337 | A1 | * | 10/2009 | Sakura | F16G 13/06 474/156 |
| 2009/0286642 | A1 | * | 11/2009 | Takagishi | F16G 13/06 474/231 |
| 2010/0093475 | A1 | * | 4/2010 | Miyazawa | F16G 13/06 474/231 |
| 2011/0263369 | A1 | * | 10/2011 | Kurihara | F16G 13/02 474/206 |
| 2011/0294616 | A1 | * | 12/2011 | Fujiwara | F16G 13/06 474/207 |
| 2014/0283955 | A1 | * | 9/2014 | Watanabe | C23C 8/26 148/230 |
| 2014/0323255 | A1 | * | 10/2014 | Kurematsu | F16G 13/06 474/140 |
| 2015/0018147 | A1 | * | 1/2015 | Belmer | F16G 13/06 474/111 |

FOREIGN PATENT DOCUMENTS

| | | |
|---|---|---|
| GB | 2 051 859 A | 1/1981 |
| WO | WO 2004/099041 A2 | 11/2004 |

OTHER PUBLICATIONS

International Search Report with English Translation, dated Feb. 26, 2016, pp. 1-4, issued in International Patent Application No. PCT/EP2015/075627, European Patent Office, Rijswijk, The Netherlands.

* cited by examiner

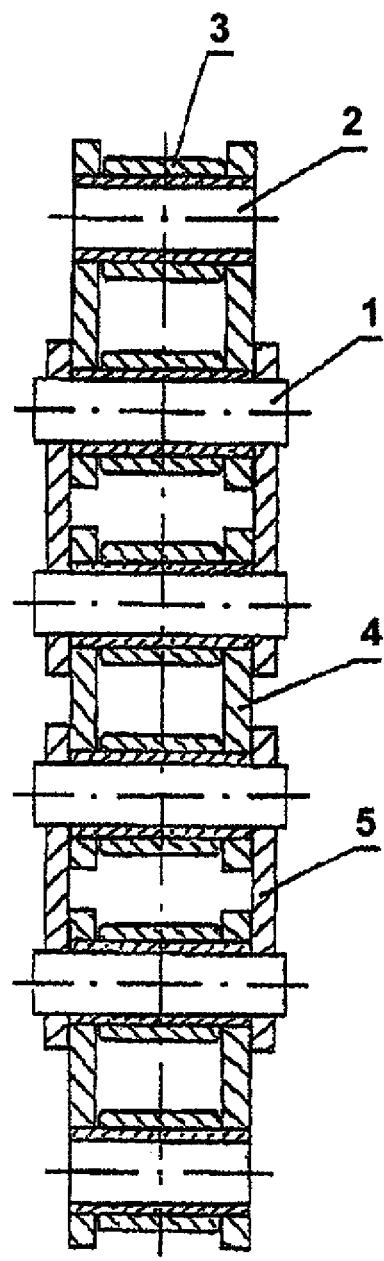

ROLLER CHAIN

RELATED APPLICATIONS

The present patent document is a continuation of PCT Application Ser. No. PCT/EP2015/075627, filed Nov. 3, 2015, which claims priority to German Patent Application No. DE 20 2014 105 286.0, filed Nov. 4, 2014. All of the foregoing applications are hereby incorporated by reference.

BACKGROUND

1. Technical Field Text

The disclosure relates to a roller chain and more particularly to a roller chain with pins, bushings, rollers, inner plates and outer plates.

2. Background Information

Roller chains, which are often used for drives, are subjected to high wear at locations where surfaces are mounted on one another in a sliding manner, in particular on inner sides of the bushings and outer surfaces of the pins which bear on these. Usually, a good lubrication is provided at these mentioned locations in order to contain the wear. However, an insufficient lubrication normally leads to rapid damaging or destruction of the chain and moreover to drastic energy losses.

SUMMARY

According to the state of the art, it is known to coat the pins and/or the bushings with nitrides, in order to reduce the proneness of such chains to damage, also in the case of insufficient lubrication. These known chains too have the disadvantage that with a dry-running of the chain due to lack of sufficient lubrication the wear which occurs on at least one of the surfaces which slide on one another in each case exceeds a desired small amount.

A high resistance of the chain parts to corrosion is also desired. This is provided by austenitic steels which are alloyed with chromium. However, this material does not have a sufficient hardness in order to achieve the desired wear-resistance. If the surface of the austenitic steel is hardened by way of one of the known nitriding methods, such as gas nitriding, plasma nitriding or impulse-plasma nitriding, then although an edge layer forms which comprises chromium nitride and has the desired hardness and, thus, wear-resistance, its corrosion-resistance, however, is significantly reduced.

A roller chain of the known type is known from DE 20 2005 008 582 U1, in which the pins consist of austenitic stainless steel and their surface layer is formed by an S-phase of the austenitic steel which is obtained by nitriding. On account of this, the edge layer of the pins does not contain chromium nitride lowering the corrosion resistance of the surface. The S-phase of the austenitic steel, which is also called expanded austenite, represents a solid solution of nitrogen in the austenitic steel. The initial austenite lattice is expanded due to the incorporation of nitrogen.

The formation of chromium nitride takes place when the nitriding is effected at a temperature above 500° C. Common nitriding methods operate in this temperature range, since the diffusion of nitrogen into the austenitic steel is extremely slow at lower temperatures, so that a method temperature of less than 400° C., which rules out the formation of chromium nitride, is not acceptable for economic reasons. However, implantation of nitrogen, which can be carried out at temperatures below 400° C. and with an adequate speed, is an approach which is acceptable from an economic point of view.

By way of this nitriding procedure, the surface hardness can be increased for example from between 400 and 500 HV to about between 900 and 1000 HV, whilst the corrosion resistance of the austenitic steel is practically not compromised.

However, it has been found that despite this, the desired wear resistance between components of a roller chain which are mutually frictionally engaged, such as between a pin and a bushing or a bushing and a roller, is often not obtained if these consist of the same material, for example both of austenitic steel or both of a ferritic steel, possibly with a nitriding.

The present disclosure provides a roller chain with pins, bushings, rollers, inner plates and outer plates, in which two bushings are connected to one another in each case by way of at least two inner plates and form a chain link by way of this, wherein a roller encompassing the bushing is rotatably mounted on each bushing and wherein two consecutive chain links are articulately connected to one another in each case by way of each bushing being seated on a pin which projects beyond the bushing at both ends of this bushing, and two pins which are thus encompassed by consecutive chain links being connected at least by way of two outer plates, in which roller chain the components which are in frictional engagement in each case have a high wear resistance.

According to the disclosure, in at least one of the combinations which consist of two mutually frictionally engaged components—the pin and bushing on the one hand, the bushing and roller on the other hand—in each case the one component consists of austenitic stainless steel with an S-phase which is formed at least on the surface by way of nitriding at a temperature between about 400° C. and 500° C., and the other component consists of a stainless ferritic steel which, at least on the surface, is nitrided at a temperature between about 1000° C. and 1200° C.

Surprisingly, it has been found that with such a combination of materials rubbing on one another, the wear resistance is significantly higher than with the use of identical materials, for example in each case of austenitic steel which is nitrided at a temperature between about 400° C. and 500° C., or in each case of ferritic steel which is nitrided at a temperature between about 1000° C. and 1200° C.

Ferritic, stainless steels can be nitrided at temperatures above 950° C., through which a hardness of up to 600 HV can be obtained and an increased core hardness can be simultaneously produced. This provides an adequate basic strength to support the formed hard outer layer.

BRIEF DESCRIPTION OF THE DRAWINGS

The embodiments may be better understood with reference to the following drawing and description. The components in the figure are not necessarily to scale.

An embodiment is hereinafter explained by way of FIG. 1, which shows a longitudinal section through a section of a roller chain.

DETAILED DESCRIPTION

The roller chain which is shown in FIG. 1 consists of pins 1, bushings 2, rollers 3, inner plates 4 and outer plates 5. Two bushings 2 are connected to one another in each case by way of two inner plates 4 fixedly connected to these bushings 2 and with these two inner plates 4 form a chain link, wherein a roller 3 encompassing the bushing 2 is rotatably mounted on each bushing 2. Two consecutive chain links of this type are articulately connected to one another in each case by way of each bushing 2 being seated on a pin 1 projecting beyond this bushing 2 at both ends of this bushing and two pins 1, which are thus encompassed by two consecutive chain links, being connected by way of two outer plates 5, wherein the two ends of each pin are each connected to an outer plate 5. According to the disclosure, the pins 1 consist of austenitic stainless steel with an S-phase which is formed at least on the surface by way of nitriding at a temperature between about 400° C. and 500° C., and the bushings 2 consist of a stainless, ferritic steel which is nitrided at least on the surface at a temperature between about 1000° C. and 1200° C., or, vice versa, the bushings 2 consist of austenitic stainless steel with an S-phase formed at least on a surface by way of nitriding at a temperature between 400° C. and 500° C. and the pins 1 consist of stainless ferritic steel which at least on the surface is nitrided at a temperature between about 1000° C. and 1200° C. Moreover, the bushings 2 consist of austenitic stainless steel with an S-phase which is formed at least on the surface by way of nitriding at a temperature between 400° C. and 500° C., and the rollers 3 consist of a stainless ferritic steel which at least on the surface is nitrided at a temperature between 1000° C. and 1200° C., or vice versa. However, it is also possible for only the combination of pin and bushing or only the combination of bushing and roller to be designed in the aforesaid manner.

In another example, a roller chain includes pins (1), bushings (2), rollers (3), inner plates (4) and outer plates (5), wherein two bushings (2) are connected to one another in each case by way of at least two inner plates (4) and by way of this form a chain link, wherein a roller (3) encompassing the bushing (2) is rotatably mounted on each bushing (2) and wherein two consecutive chain links are articulately connected to one another in each case by way of each bushing (2) being seated on a pin (1) which projects beyond the bushing (2) at both ends of this bushing (2) and two pins (1) which are thus encompassed by consecutive chain links being connected at least by way of two outer plates (5). This is characterised in that in at least one of the combinations which consist of two mutually frictionally engaged components—the pin (1) and bushing (2) on the one hand the bushing (2) and roller (3) on the other hand—in each case the one component consists of austenitic stainless steel with an S-phase which is formed at least on the surface by way of nitriding at a temperature between 400° C. and 500° C., and the other component consists of a stainless ferritic steel which at least on the surface is nitrided at a temperature between 1000° C. and 1200° C.

All of the discussion, regardless of the particular implementation described, is illustrative in nature, rather than limiting. For example, although selected aspects, features, or components of the implementations are depicted in the figure as being a particular type of component, other components have similar functionality are possible. Thus, although specific components are described above, methods, systems, and articles of manufacture described herein may include additional, fewer, or different components. Further, to clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

The invention claimed is:

1. A roller chain comprising:
pins, bushings, rollers, inner plates, and outer plates, wherein two bushings are connected to one another in each case by way of at least two inner plates to form a chain link, wherein a roller encompassing a respective bushing is rotatably mounted on each bushing and wherein two consecutive chain links are articulately connected to one another in each case by way of each bushing being seated on a pin, which projects beyond the bushing at both ends of the bushing, and two pins, which are thus encompassed by consecutive chain links being connected at least by way of two outer plates,
wherein a first combination comprises the pin and the bushing as two mutually frictionally engaged components and a second combination comprises the bushing and the roller as two mutually frictionally engaged components, and wherein at least one of the first combination or the second combination include as the two mutually frictionally engaged components a first component consisting of austenitic stainless steel with an S-phase formed at least on the surface by way of nitriding at a temperature between about 400° C. and 500° C., and a second component consists of a stainless ferritic steel which at least on the surface is nitrided at a temperature between about 1000° C. and 1200° C.

2. The roller chain according to claim 1, wherein the bushing comprises austenitic steel, and the pin and the roller in each case consist of ferritic steel.

3. A roller chain according to claim 1, wherein the bushing comprises ferritic steel, and the pin and the roller in each case comprise austenitic steel.

* * * * *